Jan. 9, 1945. M. BISHEFF 2,366,695
PICTURE SUPPORT
Filed Feb. 15, 1943
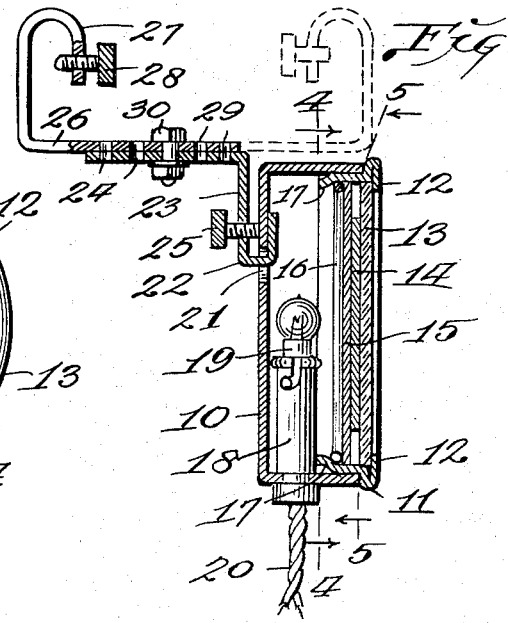
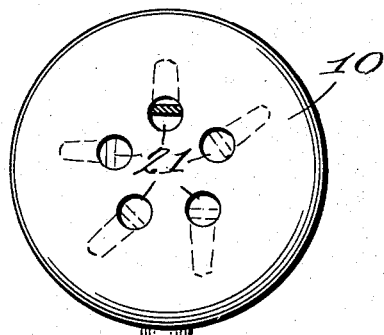
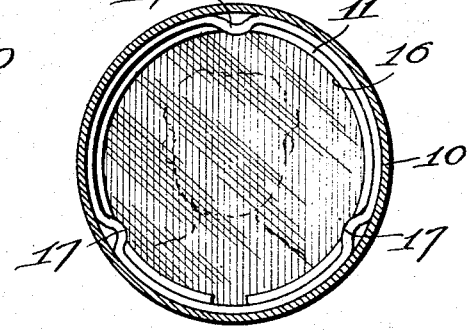
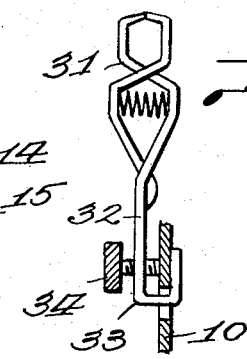
INVENTOR.
MATHEW BISHEFF.
BY Martin P. Smith, ATTY.

Patented Jan. 9, 1945

2,366,695

UNITED STATES PATENT OFFICE 2,366,695

PICTURE SUPPORT

Mathew Bisheff, Los Angeles, Calif.

Application February 15, 1943, Serial No. 475,881

1 Claim. (Cl. 248—229)

My invention relates to an illuminated picture, and has for its principal object to provide simple, practical and attractive means for illuminating a picture, for instance, the picture of a child, sweetheart or relative, which picture is mounted in a frame, or housing, between two layers of transparent material, and with a source of light, such as an electric lamp positioned behind the picture.

A further object of my invention is to provide a convenient and attractive illuminated picture that may be conveniently mounted within a motor vehicle, for instance, upon the dash, the windshield frame, the steering wheel or steering column.

A further object of my invention is to provide an illuminated picture of the character referred to wherein a section of colored transparent material is positioned between the picture and the source of light, thus producing a colored illuminated background for the picture, and which materially increases the attractiveness thereof.

With the foregoing and other objects in view, my invention consists in certain novel features of construction and arrangement of parts that will be hereinafter more fully described and claimed, and illustrated in the accompanying drawing in which:

Fig. 1 is a front elevational view of an illuminated picture constructed in accordance with my invention.

Fig. 2 is a vertical section taken on the line 2—2 of Fig. 1.

Fig. 3 is a rear elevational view of the housing in which the picture and illuminating means are positioned.

Fig. 4 is a vertical section taken on the line 4—4 of Fig. 2.

Fig. 5 is a vertical section taken on the line 5—5 of Fig. 2.

Fig. 6 is a detailed view showing a modified form of bracket for mounting the picture.

Referring by numerals to the accompanying drawing which illustrates a preferred embodiment of my invention, 10 designates a shallow cup-shaped housing, preferably formed of sheet metal, plastics or the like, and of any convenient size and shape.

Removably positioned in the opened front end of the housing 10 is a bezel 11 provided on its forward edge with an inwardly presented flange and positioned within said bezel with its edge bearing against said flange is a disc 13 of clear glass, or other transparent material. Positioned against the inner face of the transparent disc 13 is the picture 14 that is to be illuminated, and which picture may be a cut-out photograph, or a photographic print made on film or the like. Positioned directly against the rear face of the picture is a disc 15 of thin transparent material that may be colored as desired, and said disc is retained in position within the bezel by a resilient snap ring 16 which is positioned behind lips 17, the latter being bent inwardly from the inner edge of the wall of bezel 11.

Seated in the bottom of the housing 10 is an upwardly projecting socket 18 in which is removably positioned a small electric lamp 19, and convenient current conductors 20 lead from a suitable source of supply to the contacts of said lamp.

Formed in the rear wall of housing 10, adjacent the center thereof, is a series of apertures 21, which in addition to permitting air to circulate through the housing, provides means for receiving the hook end 22 of an inverted L-shaped bracket 23, the horizontal leg of which is provided with a series of apertures 24.

Set screw 25 passes through the leg of the bracket adjacent the hook end thereof in order to clamp said hook to the housing after the end of said hook has been inserted through one of the apertures 21 as illustrated in Fig. 2.

By providing a plurality of apertures 21, the bracket 23 may be positioned at practically any angle at the rear side of the housing 10 as illustrated by dotted lines in Fig. 3.

Overlying the horizontal leg of bracket 23 is a horizontal leg of a substantially L-shaped bracket 26, the vertical leg of which terminates in a hook 27 in which is seated a set screw 28, thus, enabling said bracket to be detachably secured to a fixed part of a motor vehicle, such as the dash, or the windshield frame.

Formed in the horizontal leg of bracket 26 are apertures 29, and a fastening means such as a bolt 30 is positioned through any one of said apertures and one of the apertures 24 in bracket 23 so as to adjustably connect the two brackets. Obviously, bracket 26 may extend in any direction from the bracket as is shown by dotted lines in Fig. 2, thus making the mounting for the housing universal.

In Fig. 6, I have shown a modified form of the bracket and in this construction, one member of a pair of spring pressed jaws 31 is provided with an extension leg 32 which terminates in a hook 33, and a set screw 34 passes through the leg opposite the hook so as to clamp the same to the rear wall of the housing.

When the housing of the picture is mounted on a fixed support, and the lamp 19 is lighted, the rays of light therefrom will pass through the colored transparent disc 15 around the picture 14 positioned between the transparent discs 13 and 15, thus producing a colored illumination which is very pleasing in effect.

Bezel 11 is readily removable from the housing and snap ring is readily removable from said bezel, thus enabling different pictures and differently colored transparent discs to be positioned within and removed from the bezel.

The universal bracket which may be adjustably connected to the housing provides simple and effective means for firmly securing said housing at any desired point within the vehicle.

Thus, it will be seen that I have provided an illuminated picture that is relatively simple in construction, inexpensive of manufacture, and very effective in performing the functions for which it is intended. It will be seen and understood that minor changes in the size, form and construction of the various parts of my illuminated picture may be made and substituted for those herein shown and described without departing from the spirit of my invention, the scope of which is set forth in the appended claims.

I claim as my invention:

An illuminated picture supporting bracket comprising an inverted L-shaped member, the lower portion of the vertical leg of which member terminates in a U-shaped member, a clamping screw seated in the leg of the U-shaped member which is connected to the vertical leg of said inverted L-shaped member for clamping an interposed member against the other leg of said U-shaped member, an L-shaped member, the horizontal leg of which overlies the horizontal leg of said inverted L-shaped member, means for clamping the horizontal legs of said L-shaped member and inverted L-shaped member to each other in differently adjusted positions, the vertical leg of said L-shaped member terminating in an inverted U-shaped member and a clamping screw seated in the leg of said inverted U-shaped member opposite the leg which is connected to the vertical leg of said L-shaped member.

MATHEW BISHEFF.